March 11, 1969 R. H. DU HAMEL 3,432,775

WIDE-BAND HYBRID NETWORK

Filed Oct. 8, 1965 Sheet 1 of 3

INVENTOR.
RAYMOND H. DU HAMEL,
BY
[signature]
ATTORNEY.

INVENTOR.
RAYMOND H. DUHAMEL
BY

ATTORNEY.

INVENTOR.
RAYMOND H. DU HAMEL,
BY
Don O. Denniso[illegible]
ATTORNEY.

United States Patent Office 3,432,775
Patented Mar. 11, 1969

3,432,775
WIDE-BAND HYBRID NETWORK

Raymond H. Du Hamel, Fullerton, Calif., assignor to Hughes Aircraft Company, Culver City, Calif., a corporation of Delaware
Filed Oct. 8, 1965, Ser. No. 494,181
U.S. Cl. 333—11 5 Claims
Int. Cl. H01p 5/12, 5/14, 3/00

ABSTRACT OF THE DISCLOSURE

A microwave hybrid network having an extremely wide operating range is disclosed. A basic embodiment of the invention comprises a pair of mutually coupled transmission line sections and a pair of uncoupled transmission line sections. One end of each of the coupled transmission lines is connected at a junction to an end of one of the uncoupled lines. The remaining ends comprise the network ports. The characteristic impedances and mutual coupling of the coupled transmission line sections are tapered over their entire lengths so as to provide wide-band operation.

This invention relates to high-frequency wave transmission systems and more specifically to wide-band coupling arrangements commonly known as hybrid networks.

One of the more useful, and in many cases essential, circuit arrangements employed in wave transmission systerms is the co-called hybrid network. In the past, hybrid networks have found application in power dividers, directional couplers, detectors, and in many diverse communications systems.

Just as there is a wide variety of applications for which hybrid networks are suited, there is also a wide variety of forms which hybrid networks have assumed. In the past, these forms have ranged from interconnected, multiturn transformer arrangements to the well-known magic-T. However, as the range of useful frequencies has increased into the shorter microwave regions, many of the prior art hybrid networks have proven unsatisfactory.

In addition to the limitations of prior art hybrid networks brought about by requirements of higher operating frequencies, so too have limitations arisen by virtue of increased bandwidth requirements. For example, in many modern wide-band antenna and receiver systems, it is desirable to tune over frequency bandwidths of ten-to-one or more. Most prior art hybrid structures are incapable of so doing.

While the problem of extending the useful frequency range of hybrid networks has received the attention of many investigators, current circuit arrangements still fall short of fulfilling the bandwidth requirements presently encountered in the art. For example, conventional waveguide hybrid structures, because of their inherent low-frequency cutoff and high-frequency multimode behavior, have limited bandwidth potential. Conventional hybrid coil arrangements, on the other hand, are frequency limited by their inherent interwinding capacitance and series self-inductance.

It is therefore an object of the present invention to increase the operating frequency range and bandwidth of hybrid networks.

It is another object of the present invention to provide a wide-band hybrid network characterized by its structural simplicity and ease of fabrication.

In keeping with the principles of the present invention, these objects are accomplished by a unique combination of mutually coupled and uncoupled sections of high-frequency transmission lines. In a basic embodiment of the present invention, two mutually coupled transmission line sections each have one end conductively connected to one end of a section of uncoupled transmission line. The unconnected end of each of the four transmission line sections forms one of the ports of the hybrid network. In general, the lengths of all four sections of transmission line are substantially the same and are determined by the lowest frequency of intended operation.

The frequency range of operation theoretically includes all frequencies above the predetermined low-frequency cutoff. Wide-band operation is assured by the coupled transmission line sections which behave as substantially perfect reflectionless transformers. To the extent that the transmission line sections and the junctions connecting them depart from perfection, so too will the operation of the hybrid network depart from theory.

The hybrid network of the present invention can be realized with coaxial, parallel wire or other transmission line configurations. Because of the many advantages enjoyed by strip transmission lines, however, the various embodiments of the present invention will be described in terms of such transmission lines as the basic structural elements.

The above-mentioned and other features and objects of this invention will become more apparent by reference to the following description taken in conjunction with the accompanying drawings, wherein.

Figure 1:
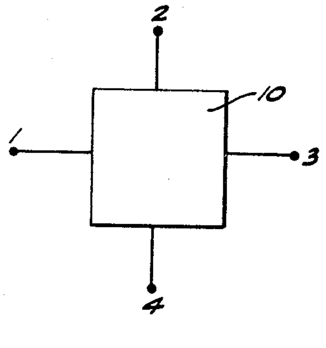
FIG. 1 is a generalized block diagram of a hybrid network.

Referring more specifically to the drawings, FIG. 1 is a generalized block diagram of an ideal hybrid network. The hybrid network 10 comprises two pairs of conjugate ports 1 and 3, and 2 and 4. The operation of an ideal biconjugate hybrid network is such that power applied to port 1 or 3 is delivered entirely to ports 2 and 4 with no direct transmission from port 1 to port 3 and vice versa. Similarly, power applied to port 2 or 3 is delivered entirely to ports 1 and 3 with no direct transmission between ports 2 and 4 and vice versa.

The relative phase of the voltages appearing at the various ports of hybrid network 10 depends upon which port is utilized as the input. For example, an ideal hybrid network can be designed to yield output voltages at ports 2 and 4 which are 180 degrees out of phase when port 1 is excited and to yield in-phase voltages when port 3 is excited.

Figure 2:
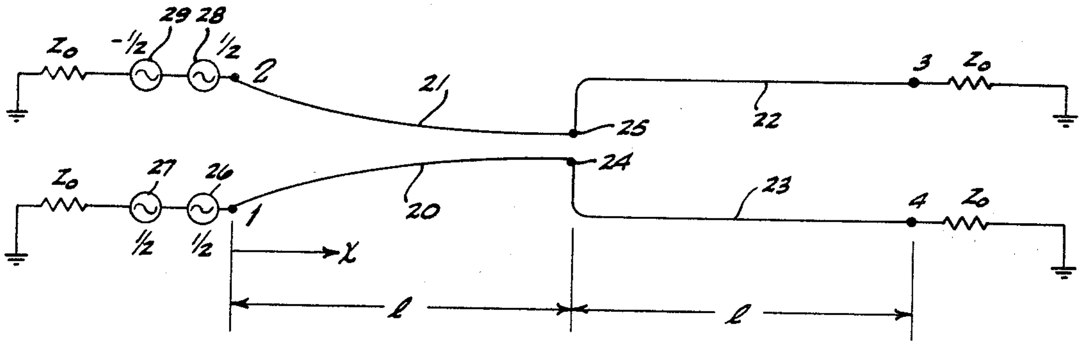
FIG. 2 is a schematic diagram of one embodiment of the present invention.

In FIG. 2 there is shown a schematic diagram of one embodiment of the present invention. In the embodiment of FIG. 2 the hybrid network comprises a pair of coupled transmission line sections 20 and 21 and a pair of uncoupled transmission line sections 22 and 23. Each transmission line section has an equivalent electrical length $l$. One end of transmission line section 20 is conductively connected to one end of transmission line section 23 at junction 24. Similarly, one end of transmission line section 21 is conductively connected to an end of transmission line section 22 at junction 25. The other ends of transmission line sections 20, 21, 22 and 23 terminate at ports 1, 2, 3 and 4 of the hybrid network, respectively, which correspond to the identically designated ports of the hybrid network of FIG. 1.

Each of the uncoupled transmission line sections 22 and 23 has a uniform characteristic impedance $Z_0$ over its entire length. The characteristic impedances of coupled transmission line sections 20 and 21, on the other hand, vary smoothly from one end to the other, as will be explained in greater detail hereinbelow.

Because of the symmetry of the hybrid network of FIG. 2, its operation is conveniently analyzed in terms of even and odd modes of excitation. A detailed description of this analysis technique is given in the article "A Method of Analysis of Symmetrical Four-Port Networks," by J. Reed and G. J. Wheeler, appearing in the IRE Transactions on Microwave Theory and Techniques, vol. MTT-4, pp. 246–252, October 1956. For this purpose, each port of the hybrid network is shown terminated by an impedance equal to $Z_0$, each of which, in practice, can represent equivalent source or load impedances. An even mode generator 26 and an odd mode generator 27, each having a normalized output of ½ unit are serially connected between port 1 and its corresponding terminating impedance. An even mode generator 28 having an output of ½ unit and an odd mode generator 29 having an output of −½ unit are serially connected between port 2 and its corresponding terminating impedance. From the principle of superposition, it is seen that the combination of generators 26, 27, 28 and 29 is equivalent to one generator having unitary output connected to port 1.

Figure 3:
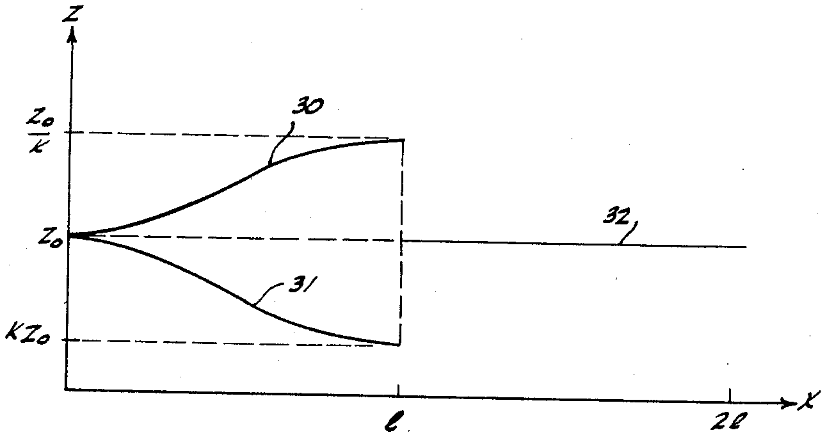
FIG. 3 is a graphical representation of the impedance characteristics of the embodiment of FIG. 2.

Coupled transmission line sections 20 and 21 are designed so that the square root of the product of the characteristic impedances seen by the even and odd modes is equal to $Z_0$ along their entire length. The even and odd mode characteristic impedances of the embodiment of FIG. 2 are shown graphically in FIG. 3. In FIG. 3 the magnitudes of the characteristic impedances of the transmission line sections are shown as a function of the distance $x$ along the length of the lines. At the left of the hybrid network, at ports 1 and 2, the even and odd mode characteristic impedances are each equal to $Z_0$. That is, lines 20 and 21 are uncoupled at $x=0$.

Moving toward junctions 24 and 25 along transmission line sections 20 and 21 the even mode characteristic impedance $Z_{0e}$ gradually increases as shown by curve 30 until at $x=l$ it is equal to $Z_0/K$. The odd mode characteristic impedance $Z_{0o}$, on the other hand, gradually decreases as shown by curve 31 until at $x=l$ it is equal to $kZ_0$. The ratio of the coupled outputs of the hybrid network is determined by the parameter $k$, which is less than unity. As pointed out above, $$Z_0=\sqrt{Z_{0e}Z_{0o}} \qquad (1)$$

for all values of $x$ from $x=0$ to $x=l$.

At junctions 24 and 25, the coupled transmission line sections 20 and 21 are connected to uncoupled transmission line sections 22 and 23. The characteristic impedances of lines 22 and 23, shown by curve 32, are each equal to $Z_0$ over their entire lengths from $x=l$ to $x=2l$.

Ideally, coupled transmission line sections 20 and 21 serve as reflectionless transformers for the even and odd modes over the frequency band of operation. It is apparent therefore that wave energy propagating within the hybrid network is partially reflected only at junctions 24 and 25 where the characteristic impedances are mismatched. To the extent that the behavior of the actual transmission line elements differ from the assumed ideal, the operation of the present invention will differ from the theory given below. By utilizing proper design and construction techniques within the scope of the art, however, errors introduced by non-ideal elements can be minimized.

As pointed out in the above-mentioned article of Reed and Wheeler, the scattering coefficients for a network having the symmetry of the hybrid network of FIG. 2 are easily expressed in terms of the reflection and transmission coefficients for the even and odd modes of excitation. Due to symmetry, these coefficients can be determined by viewing the structure as a combination of two cascaded transmission line sections. When this is done it is found that the scattering coefficients are:

$$S_{11}=S_{22}=\tfrac{1}{2}(R_{1e}+R_{1o})$$
$$S_{12}=\tfrac{1}{2}(R_{1e}-R_{1o})$$
$$S_{13}=\tfrac{1}{2}(T_{1e}-T_{1o})$$

and $$S_{14}=\tfrac{1}{2}(T_{1e}+T_{1o}) \qquad (2)$$

where $R_{1e}$ and $R_{1o}$ are the reflection coefficients and $T_{1e}$ and $T_{1o}$ are the transmission coefficients for the even and odd modes of excitation, respectively.

The scattering coefficients $S_{44}$, $S_{33}$ and $S_{43}$ can be found by considering generators 26, 27, 28 and 29 connected to ports 3 and 4. This yields:

$$S_{33}=S_{44}=\tfrac{1}{2}(R_{2e}+R_{2o})$$

and $$S_{43}=\tfrac{1}{2}(R_{2e}-R_{2o}) \qquad (3)$$

The remaining scattering coefficients can be determined from Equations 2 and 3 and from symmetry of the network. Thus, $$S_{13}=S_{24}$$
$$S_{14}=S_{23}$$

etc. (4)

In terms of the impedances and coupling coefficients of transmission line sections 20, 21, 22 and 23, the even mode reflection coefficient at port 1 is given by $$R_{1e}=\frac{Z_0-\frac{Z_0}{k}}{Z_0+\frac{Z_0}{k}}\exp(-j2\theta)=\frac{k-1}{k+1}\exp(-j2\theta) \qquad (5)$$

where $\theta$ is equal to the equivalent electrical length of the transmission line sections and is equal to the phase constant of the lines times the physical length $l$. It is recognized that Equation 5 can be simply considered as the reflection coefficient of a line of impedance $Z_0/k$ terminated with an impedance $Z_0$ and delayed in phase by twice the equivalent electrical length of the line. It can be further shown that:

$$R_{1o}=\frac{Z_0-kZ_0}{Z_0+kZ_0}\exp(-j2\theta)=\frac{1-k}{1+k}\exp(-j2\theta),\ R_{1o}=-R_{1e} \qquad (6)$$

In a similar manner it is found that:

$$R_{2e}=-R_{1e} \text{ and } R_{2o}=-R_{1o} \qquad (7)$$

and that, $$T_{1e}=T_{1o}=\frac{2k^{1/2}}{1+k}\exp(-j2\theta) \tag{8}$$

By combining Equations 2 through 8 and simplifying, the scattering matrix of the embodiment of FIG. 2 is:

$$S=\begin{vmatrix} S_{11} & S_{12} & S_{13} & S_{14} \\ S_{21} & S_{22} & S_{23} & S_{24} \\ S_{31} & S_{32} & S_{33} & S_{34} \\ S_{41} & S_{42} & S_{43} & S_{44} \end{vmatrix}$$

$$S=\begin{vmatrix} 0 & -\alpha & 0 & \beta \\ -\alpha & 0 & \beta & 0 \\ 0 & \beta & 0 & \alpha \\ \beta & 0 & \alpha & 0 \end{vmatrix} \tag{9}$$

where:

$$\alpha=\frac{1-k}{1+k}\exp(-j2\theta) \tag{10}$$

and $$\beta=\frac{2k^{1/2}}{1+k}\exp(-j2\theta) \tag{11}$$

By comparing Equation 9 with the scattering matrix of a magic-T (as given for example in "Principles of Microwave Circuits," M.I.T. Rad. Lab. Series, vol. 8, McGraw-Hill, New York, 1948, at pp. 447 et seq.), it is seen that the embodiment of FIG. 2 is electrically equivalent thereto. That is, all four ports are matched, and there is complete isolation between conjugate ports. In addition, it is seen that the ratios of the outputs of the present invention $\alpha/\beta$ can be readily chosen by selecting the proper value of parameter $k$.

As mentioned above in connection with the ideal network of FIG. 1, wave energy is delivered entirely to ports 2 and 4 when port 1 is excited. In most instances, it is convenient to utilize hybrid networks which split the power evenly between the two output ports. Such a hybrid is generally termed a "3 db hybrid." That is, with wave energy having a voltage amplitude of unity applied to port 1, the output voltages at ports 2 and 4 are 0.707. For such a structure it is found that $R_{1e}$ is 0.707. By substituting into Equations 5 and 1, $k=0.1717$ and $$Z_{0e}=5.83Z_0$$

at $x=l$.

The hybrid network of FIG. 2 and the other embodiments to be described, behave as high-pass devices. By this, it is meant that, in theory, the frequency range of operation includes frequencies from a certain low frequency termed the cutoff frequency to infinity. In practice, the lower limit or cutoff frequency is determined by the length and design of the coupled transmission line sections 20 and 21. The upper frequency of the band of operation is primarily determined by the size and design of junctions 24 and 25. In order to increase the upper frequency limit, junctions 24 and 25 should be made as small as possible.

When properly designed, coupled transmission line sections 20 and 21 behave as perfect transformers for the above-mentioned even and odd modes of excitation. That is, they have a continuous taper from the regions thereof near ports 1 and 2 to junctions 24 and 25 respectively. The design of transmission line tapers is, in itself the topic of many investigators in the art. It has been found that satisfactory results are obtained if coupled transmission lines 20 and 21 are tapered in accordance with the design proposed by R. W. Klopfenstein in an article entitled, "A Transmission Line Taper of Improved Design," appearing in the Proceedings of the I.R.E., vol. 44, No. 1, pp. 31–35, January 1956.

By way of example, a hybrid network was designed utilizing the "equal ripple reflection coefficient" taper of the above-cited Klopfenstein article. The power delivered to port 2 was chosen to be 8.36 db down from the power applied to port 1. The magnitude of the reflection coefficient $R_{1e}$, therefore, corresponded to 0.383, $k=0.446$ and $Z_{0e}=2.24Z_0$. A maximum mean variation or ripple in the ratio of the coupled outputs was arbitrarily selected as −40 db. For such a design the length $l$ of the transmission line sections was 0.844 times the wavelength of the low-frequency cutoff. It should be mentioned that the lengths $l$ can be decreased somewhat at the expense of an increased ripple in the magnitude and phase of the coupled outputs of the hybrid network. By the same token, other taper designs such as linear or exponential can be utilized for transmission line sections 20 and 21 with some degree of success. For example, if a linear taper is utilized a somewhat longer length $l$ may be required for the same low frequency cutoff.

It has already been pointed out that the hybrid network of FIG. 2 can be realized advantageously with strip transmission line elements. Such an embodiment is shown in the plan view of FIG. 4. As is well-known in the art, strip transmission line circuits generally comprise thin ribbon-like members of electrically conductive material which can be bonded to a dielectric sheet or substrate. The dielectric substrate is in turn disposed parallel to and insulated from one or two extended conductive surfaces termed "ground planes."

Figure 4:
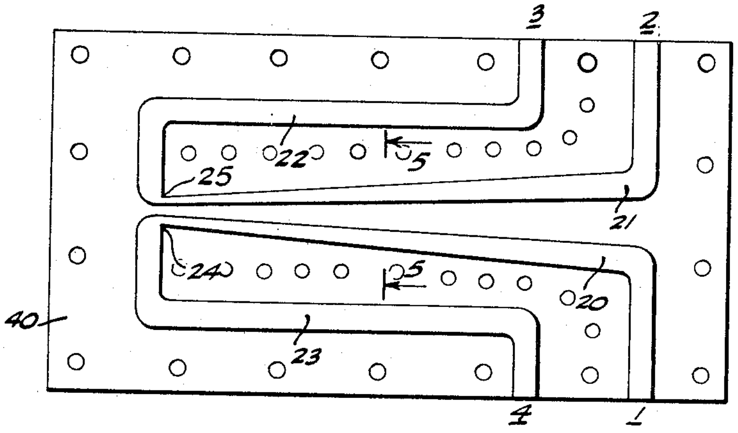
FIG. 4 is a plan view of another embodiment of the present invention utilizing strip transmission line elements.

The plan view of the embodiment of FIG. 4 shows a thin dielectric planar substrate 40 upon which are printed, etched, bonded or otherwise affixed the conductive members comprising one conductor of the transmission line sections making up the hybrid network. The numbers corresponding to transmission line sections 20, 21, 22 and 23 have been carried over from FIG. 2 to designate the conductive members. It should be emphasized, however, that whereas in FIG. 2 these reference numbers refer to transmission line sections. In FIG. 4 they only refer to one conductor of the corresponding sections. It is understood, however, that the other conductor comprises the ground plane or ground planes disposed parallel to substrate 40.

Conductive members 20, 21, 22 and 23 are disposed on one surface of substrate 40. In order to obtain the desired taper in characteristic impedance of the coupled lines the widths of members 20 and 21 decrease from the region near ports 1 and 2 to junctions 24 and 25 respectively. The variation in the mutual coupling of members 20 and 21 is provided by the variation in their physical proximity. That is, members 20 and 21 are separated by a relatively large distance at the uncoupled ends thereof near ports 1 and 2 and are in very close proximity in the region of junctions 24 and 25.

Figure 5:
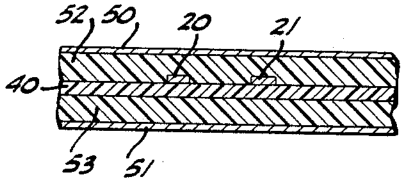
FIG. 5 is a cross-sectional view of a portion of the embodiment of FIG. 4.

A partial cross-sectional view through plane 5—5 is shown in the view of FIG. 5. In FIG. 5, a pair of substantially parallel conductive ground planes 50 and 51 are shown disposed above and below substrate 40, respectively. Dielectric sheets 52 and 53, respectively, serve to space substrate 40 from the ground planes. When assembled the structure resembles a sandwich with conductive members 20, 21, 22 and 23 in the center. Although FIGS. 4 and 5 show conductive members 20, 21, 22 and 23 as being bonded to substrate 40 it is obvious that this is merely for the sake of example. As an alternative, it is possible to affix the conductive members to dielectric sheet 52 or 53 in which case substrate 40 can be omitted. Since the entire assembly is held together between conductive ground planes 50 and 51 the completed structure is substantially the same.

For the sake of clarity, the thickness of substrate 40 has been exaggerated somewhat in FIG. 5, as have the thicknesses of members 20 and 21. As mentioned above, the relative spacing of these members is determined from the degree of coupling desired.

Figure 6:
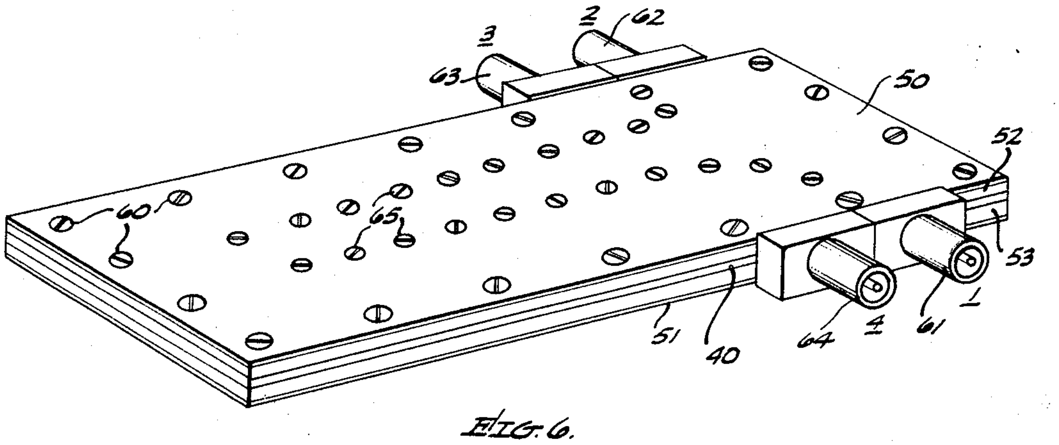
FIG. 6 is a pictorial view of the embodiment of FIG. 4 depicting a fully assembled hybrid network.

In FIG. 6 there is shown a pictorial view of the embodiment of FIG. 4 fully assembled. In FIG. 6 ground planes 50 and 51 and the intermediate layers of dielectric material 52 and 53 are held together by suitable means such as screws 60. Coaxial connectors 61, 62, 63 and 64 provide suitable coupling means for connecting ports 1, 2, 3 and 4 to appropriate utilization devices, not shown. Additional screws 65 extending between ground planes 50 and 51 are provided in order to minimize the coupling between conductive members 20 and 22, and 21 and 23.

In practice it may be difficult or inconvenient to construct a 3 db hybrid network such as that shown in FIG. 4. This is due to the fact that a very high degree of mutual coupling is required between coupled transmission line sections 20 and 21 in the region of junctions 24 and 25. If the spacing between these members can be made sufficiently small the required coupling coefficient can be obtained. In practice, however, mechanical considerations limit the minimum spacing. For these reasons it may be advantageous to construct a hybrid network comprising the cascaded combination of two networks similar to that shown in FIG. 4. Such an arrangement is shown in the schematic diagram of FIG. 7.

Figure 7:
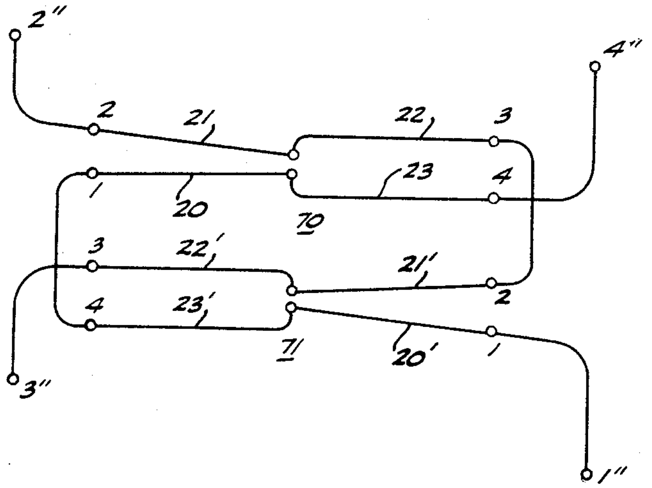
FIG. 7 is a schematic diagram of yet another embodiment of the present invention.

In FIG. 7, two substantially identical 8.36 db hybrid networks are connected in cascade to yield a hybrid network having an overall 3 db characteristic. Hybrid network 70 comprising coupled transmission line sections 20 and 21 and uncoupled transmission line sections 22 and 23 is interconnected to a second hybrid network 71 comprising corresponding transmission line sections 20′, 21′, 22′, and 23′. Networks 70 and 71 are interconnected by joining port 1 of network 70 to point 4 of network 71 and port 3 of network 70 to port 2 of network 71. The ports of the resulting 3 db hybrid network comprise ports 1 and 3 of network 71 and ports 2 and 4 of network 70, which in turn correspond to overall network ports 1″, 3″, 2″ and 4″, respectively.

In the embodiment of FIG. 7 it is found that the coupled outputs at ports 2″ and 4″ are given by $-2\alpha\beta$ and $\alpha^2-\beta^2$, respectively. Neglecting circuit losses, the total power out of the hybrid network must equal the power in. Therefore, $\alpha^2+\beta^2=1$ and for a network having an overall 3 db hybrid characteristic, $\alpha$ and $\beta$ are found to be 0.382 and 0.925, respectively.

Figure 8:
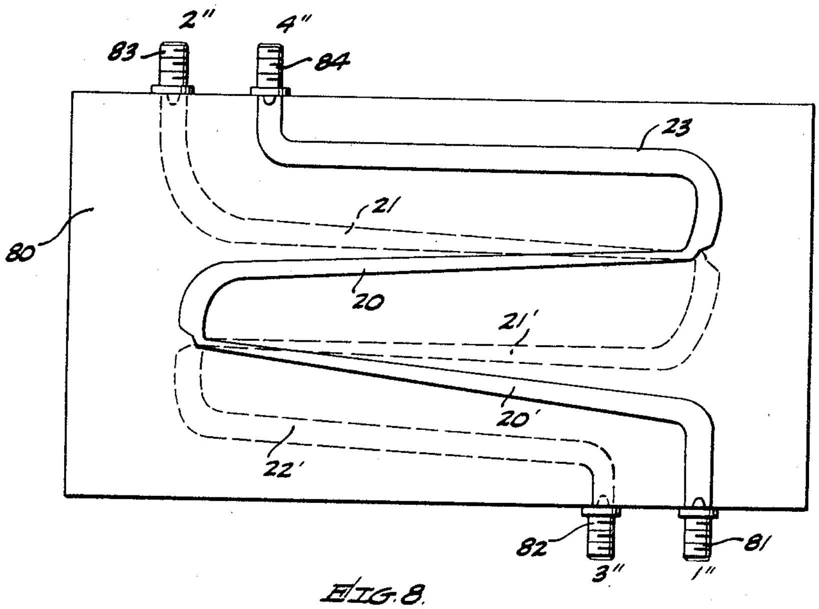
FIG. 8 is a plan view of the embodiment of FIG. 7 utilizing strip transmission line elements.

The embodiment of FIG. 7, as before, can be realized by the use of strip transmission line elements. Such an arrangement is shown in the plan view of FIG. 8. In FIG. 8 the center conductors of the strip transmission lines are shown bonded to opposite sides of dielectric substrate 80 and are designated by the reference numerals corresponding to the transmission line sections of FIG. 7. Between ports 1″ and 4″ are conductively connected the serial combination of conductive members 20′, 20 and 23. Between ports 3″ and 2″ are connected the serial combination of conductive members 22′, 21′ and 21. Members 22′ and 23 are of uniform dimensions and represent uncoupled lines. Conductive members 20 and 21, on the other hand, are tapered lines and are mutually coupled, as are members 20′ and 21′. Coaxial connectors 81, 82, 83 and 84 provide convenient means for coupling ports 1″, 3″, 2″ and 4″ of the hybrid network of FIG. 8 to external circuit means such as sources or utilization devices not shown.

In order to reduce circuit losses and to simplify the embodiment of FIG. 8, transmission line sections 22 and 23′ have been eliminated. The omission of these sections does not adversely affect the operation of the embodiment of FIG. 8, since they are both of equal length and are uncoupled. The removal of both sections has the simple effect of advancing the phase of the coupled outputs of the hybrid network an equal amount.

In the plan view of FIG. 8, the conductive ground plane or planes are not shown. As in the embodiment of FIG. 6 at least one conductive ground plane is provided and extends in a plane substantially parallel to substrate 80. The assembled structure, for example, can resemble that of FIG. 6 wherein two parallel ground planes are clamped or bolted together in a unitary structure resembling a sandwich with substrate 80 in the center.

In all cases it is understood that the above-described arrangements are illustrative of but a small number of the many possible specific embodiments which can represent applications of the principles of the present invention. Numerous and varied other arrangements can readily be devised in accordance with these principles by those skilled in the art without departing from the spirit and scope of the invention.

What is claimed is:

1. In combination, a plurality of extended signal wave transmission paths, a first end of each of said paths being adapted for connection to external circuit means, the second ends of a first and second of said paths comprising a first common junction, the second ends of a third and fourth of said paths comprising a second common junction, means for electromagnetically coupling said first and third paths over at least a substantial portion of their respective lengths, said mutual coupling between said first and third paths tapering from a maximum in the region of said second ends to a minimum in the region of said first ends, and said first and second and said third and fourth paths exhibiting an impedance mismatch at said common junctions.

2. A four-port hybrid network comprising, in combination, at least one planar conductive member; a plurality of elongated conductive strips of substantially equal length disposed parallel to and conductively insulated from said planar members, a first end of a first of said strips being conductively connected to a first end of a second of said strips, a first end of a third of said strips being conductively connected to a first end of a fourth of said strips, said first and third strips having substantially identical widths which decrease along their respective lengths from the second ends thereof to said first ends, the spacing between said first and third strips being greatest at said second end regions and decreasing gradually along their respective lengths to said first end regions, said second and fourth strips having a substantially uniform width along their respective lengths, and the second ends of each of said strips being adapted for connection to said network ports.

3. A four-port hybrid network comprising, in combination, a first and second pair of mutually coupled transmission line sections, each of said coupled transmission line sections having characteristic impedances which vary gradually along their respective lengths;

a first and second pair of uncoupled transmission line sections, each of said uncoupled transmission line sections having substantially uniform characteristic impedances over their respective lengths;

a first end of each section of said first coupled pair being conductively connected at first and second junctions to a first end of a respective one of said sections of said first uncoupled pair;

a first end of each section of said second coupled pair being conductively connected at third and fourth junctions to a first end of a respective one of said sections of said second uncoupled pair;

the second end of a section of said first uncoupled pair being conductively connected at a fifth junction to a second end of a section of said second coupled pair;

the second end of a section of said second uncoupled pair being conductively connected at a sixth junction to a second end of a section of said first coupled pair;

the characteristic impedances of said connected transmission line sections being mismatched at said first, second, third and fourth junctions; and the remaining second ends comprising said network ports.

4. The hybrid network according to claim 3, wherein the lengths of each of said transmission line sections are substantially identical and wherein the mutual coupling between each pair of coupled transmission line sections increases from a minimum in the region of said second ends to a maximum in the region of said first ends.

5. A for-port hybrid network of the type comprising, in combination, a pair of mutually coupled transmission line sections having characteristic impedances which taper along their respective lengths, a pair of uncoupled transmission line sections of substantially uniform characteristic impedances, one end of each of said coupled sections being conductively connected at a junction to one end of a respective one of said uncoupled sections, the other ends of each of said sections comprising said network ports, said network being characterized by a mismatch in the characteristic impedances of said connected sections at said junctions.

References Cited

UNITED STATES PATENTS

| | | | |
|---|---|---|---|
| 2,531,438 | 11/1950 | Jones | 333—10 XR |
| 2,679,632 | 5/1954 | Bellows | 333—10 |
| 2,775,740 | 12/1956 | Oliver | 333—10 |
| 2,794,959 | 6/1957 | Fox | 333—10 |
| 2,829,351 | 4/1958 | Fox | 333—98 XR |
| 2,934,719 | 4/1960 | Kyhl | 333—10 |
| 2,575,571 | 11/1951 | Wheeler | 333—10 |

FOREIGN PATENTS

| | | |
|---|---|---|
| 597,669 | 5/1960 | Canada. |

ELI LIEBERMAN, *Primary Examiner.*

MARVIN NUSSBAUM, *Assistant Examiner.*

U.S. Cl. X.R.

333—10, 84